(12) United States Patent
Tanabe et al.

(10) Patent No.: US 8,634,163 B2
(45) Date of Patent: Jan. 21, 2014

(54) DUAL REVERSE MICROWAVE ASSISTED MAGNETIC RECORDING (MAMR) AND SYSTEMS THEREOF

(75) Inventors: Hiroyasu Tanabe, Yokohama (JP); Masafumi Mochizuki, Chigasaki (JP)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 13/191,563

(22) Filed: Jul. 27, 2011

(65) Prior Publication Data
US 2013/0027803 A1 Jan. 31, 2013

(51) Int. Cl.
*G11B 5/127* (2006.01)

(52) U.S. Cl.
USPC ...................................... 360/125.3

(58) Field of Classification Search
USPC ............... 360/313–328, 125.3, 125.71, 128
See application file for complete search history.

(56) References Cited

U.S. PATENT DOCUMENTS

| | | | |
|---|---|---|---|
| 7,580,228 B1 | 8/2009 | Lauer | |
| 7,724,469 B2 | 5/2010 | Gao et al. | |
| 7,869,309 B2 | 1/2011 | Mihalcea et al. | |
| 8,274,811 B2 * | 9/2012 | Zhang et al. | 365/145 |
| 2008/0019040 A1 * | 1/2008 | Zhu et al. | 360/110 |
| 2008/0239542 A1 | 10/2008 | Yuasa et al. | |
| 2008/0304176 A1 | 12/2008 | Takagishi et al. | |
| 2009/0059423 A1 * | 3/2009 | Yamada et al. | 360/122 |
| 2009/0080106 A1 | 3/2009 | Shimizu et al. | |
| 2009/0080120 A1 | 3/2009 | Funayama et al. | |
| 2009/0262636 A1 | 10/2009 | Xue et al. | |
| 2010/0007996 A1 | 1/2010 | Iwasaki et al. | |
| 2010/0033865 A1 | 2/2010 | Hashimoto et al. | |
| 2010/0296194 A1 | 11/2010 | Gubbins et al. | |
| 2010/0309577 A1 | 12/2010 | Gao et al. | |

FOREIGN PATENT DOCUMENTS

JP 2010225230 A 10/2010

OTHER PUBLICATIONS

Zhu et al., "Microwave Assisted Magnetic Recording," 2007 IEEE, IEEE Transactions on Magnetics, vol. 44, No. 1, Jan. 2008, pp. 125-131.
Tang et al., "Narrow Track Confinement by AC Field Generation Layer in Microwave Assisted Magnetic Recording," 2008 IEEE, IEEE Transactions on Magnetics, vol. 44, No. 11, Nov. 2008, pp. 3376-3379.

* cited by examiner

*Primary Examiner* — Joseph Feild
*Assistant Examiner* — Gustavo Polo
(74) *Attorney, Agent, or Firm* — Zilka-Kotab, PC

(57) ABSTRACT

In one embodiment, a magnetic head includes a main magnetic pole, a first MAMR element positioned above and wider than the main magnetic pole that is positioned to extend beyond sides of the main magnetic pole in a track width direction, a spin-rectifying-current-pinned-magnetic layer, a magnetic interlayer, a FGL, a magnetic-zone-control layer, and a second MAMR element that is wider than the main magnetic pole and is positioned to extend beyond sides of the main magnetic pole in the track width direction positioned above the first MAMR element, and a trailing shield positioned above the second MAMR element, wherein the main magnetic pole is adapted for producing a high-frequency magnetic field comprising oscillating microwaves, wherein during a writing operation, current is applied to the first and second MAMR elements to produce magnetic fields which oppose bit-switching in the magnetic medium to avoid adjacent track bit reversal.

14 Claims, 8 Drawing Sheets

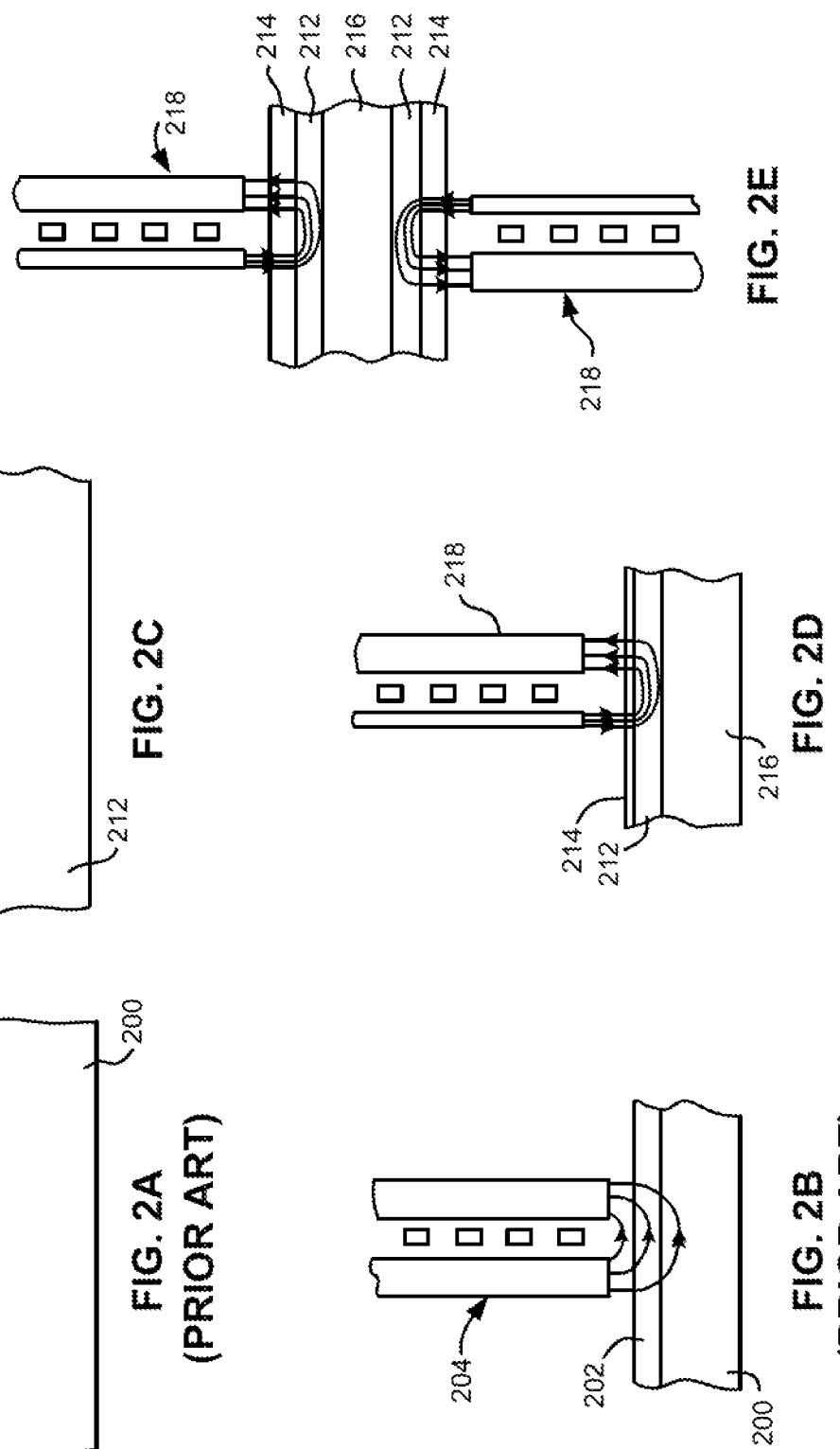

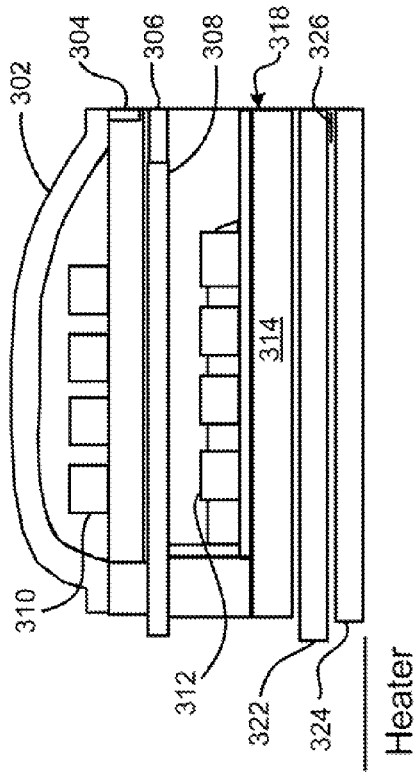
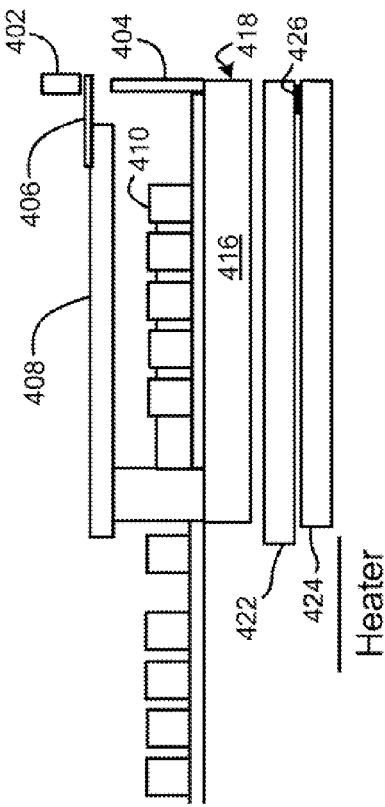
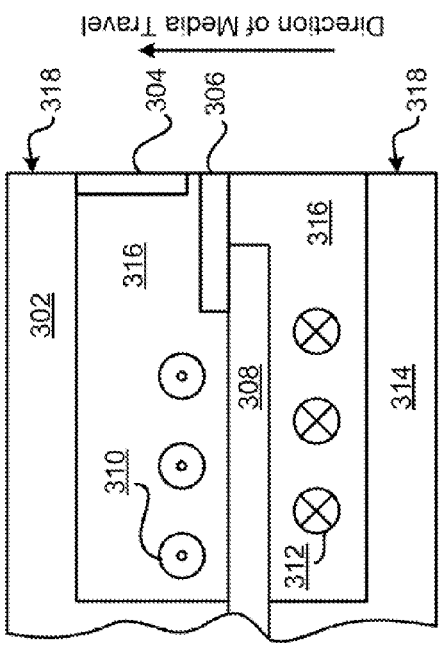
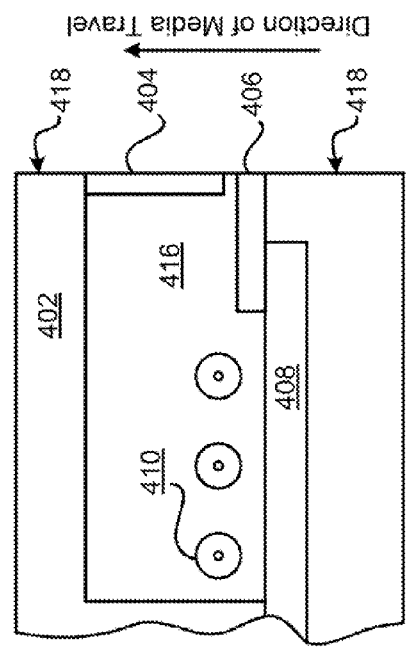

DUAL REVERSE MICROWAVE ASSISTED MAGNETIC RECORDING (MAMR) AND SYSTEMS THEREOF

FIELD OF THE INVENTION

The present invention relates to magnetic data storage systems, and more particularly, this invention relates to using dual reverse Microwave Assisted Magnetic Recording (MAMR) to store data to magnetic media.

BACKGROUND

The heart of a computer is a magnetic hard disk drive (HDD) which typically includes a rotating magnetic disk, a slider that has read and write heads, a suspension arm above the rotating disk and an actuator arm that swings the suspension arm to place the read and/or write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

The volume of information being processed and stored on HDDs is increasing rapidly. In particular, HDDs have been used to store more and more information, while remaining within their limited area and volume.

A recording medium having a large coercive force (namely, a large magnetic anisotropy) must be used in magnetic recording in order to stably maintain the recording magnetization state. However, this results in the need to use a strong recording magnetic field to record on any recording medium that has a large coercive force. In practice, magnetic materials which may be used as materials for construction of a magnetic head are limited. Consequently, the coercive force of the recording medium is constrained by the magnitude of the recording magnetic field which may be generated by the recording head using available magnetic materials.

Therefore, in some previous attempts to overcome these problems, a recording method has been used which takes advantage of various compensation methods, causing the coercive force of the recording medium to be effectively lowered only during recording. A representative example is a system which uses heat-assisted recording, which has a heating element, such as a laser, that locally heats the recording surface of the magnetic medium during recording, thereby reducing the coercive force of the recording medium so that data may be recorded.

Conventionally, in order to improve the magnetic recording density, the magnetic recording width, measured as tracks per inch (TPI), and the linear recording density, measured as bits per inch (BPI), were narrowed. To narrow the magnetic recording width, the width of the main pole (main magnetic pole) is narrowed, but the magnetic field strength drops when the width of the main pole becomes narrow, and improving the recording width density becomes difficult. In addition, since the main pole has a complex structure, the fabrication error becomes large when a narrow magnetic recording width is created, and the number of heads having a magnetic recording width, which is the target, tends to be few.

SUMMARY

In one embodiment, a magnetic head includes a main magnetic pole for writing to a magnetic medium, and a field generation layer (FGL) positioned above the main magnetic pole, wherein the main magnetic pole is adapted for producing a high-frequency magnetic field comprising oscillating microwaves, with the proviso that leakage from the high-frequency magnetic field does not cause adjacent track bit reversal.

In another embodiment, a magnetic head includes a main magnetic pole for writing to a magnetic medium, a first microwave assisted magnetic recording (MAMR) element positioned above the main magnetic pole that is wider than the main magnetic pole in a track width direction and is positioned to extend beyond sides of the main magnetic pole in the track width direction, a spin-rectifying-current-pinned-magnetic layer positioned above the first MAMR element, a magnetic interlayer positioned above the spin-rectifying-current-pinned-magnetic layer, a FGL positioned above the magnetic interlayer, a magnetic-zone-control layer positioned above the FGL, a second MAMR element positioned above the magnetic-zone-control layer that is wider than the main magnetic pole in a track width direction and is positioned to extend beyond sides of the main magnetic pole in the track width direction, and a trailing shield positioned above the second MAMR element, wherein the main magnetic pole is adapted for producing a high-frequency magnetic field comprising oscillating microwaves, wherein during a writing operation, current is applied to the first and second MAMR elements so that the first and second MAMR elements produce magnetic fields which oppose bit-switching in the magnetic medium such that leakage from the high-frequency magnetic field does not cause adjacent track bit reversal, and wherein the first and second MAMR elements are spin torque oscillator-type elements.

According to another embodiment, a method includes forming a main magnetic pole above a substrate, forming a first MAMR element above the main magnetic pole so that the first MAMR is wider than the main magnetic pole in a track width direction and is positioned to extend beyond sides of the main magnetic pole in the track width direction, forming a FGL above the first MAMR element, and forming a second MAMR element above the FGL so that the second MAMR is wider than the main magnetic pole in a track width direction and is positioned to extend beyond sides of the main magnetic pole in the track width direction.

In yet another embodiment, a method includes producing a magnetic field from a main magnetic pole of a magnetic head to write data to a magnetic medium, producing a high-frequency magnetic field comprising oscillating microwaves from the main magnetic pole to assist bit-switching in a track being written on the magnetic medium, with the proviso that leakage from the high-frequency magnetic field does not cause adjacent track bit reversal, and applying current to MAMR elements positioned above and below the main magnetic pole so that the MAMR elements produce magnetic fields which oppose bit-switching in the magnetic medium in tracks adjacent to the track being written on the magnetic medium.

Any of these embodiments may be implemented in a magnetic data storage system such as a disk drive system, which may include a magnetic head, a drive mechanism for passing a magnetic medium (e.g., hard disk) over the magnetic head, and a controller electrically coupled to the magnetic head.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

FIG. 2A is a schematic representation in cross-section of a recording medium utilizing a longitudinal recording format, according to one embodiment.

FIG. 2B is a schematic representation of one embodiment of a conventional magnetic recording head and recording medium combination for longitudinal recording as in FIG. 2A.

FIG. 2C depicts one embodiment of a magnetic recording medium utilizing a perpendicular recording format.

FIG. 2D is a schematic representation of a recording head and recording medium combination for perpendicular recording on one side of the medium, according to one embodiment.

FIG. 2E is a schematic representation of a recording apparatus adapted for recording separately on both sides of a magnetic medium, according to one embodiment.

FIG. 3A is a cross-sectional view of one particular embodiment of a perpendicular magnetic head with helical coils.

FIG. 3B is a cross-sectional view of one particular embodiment of a piggyback magnetic head with helical coils.

FIG. 4A is a cross-sectional view of one particular embodiment of a perpendicular magnetic head with looped coils.

FIG. 4B is a cross-sectional view of one particular embodiment of a piggyback magnetic head with looped coils.

DETAILED DESCRIPTION

Figure 1:
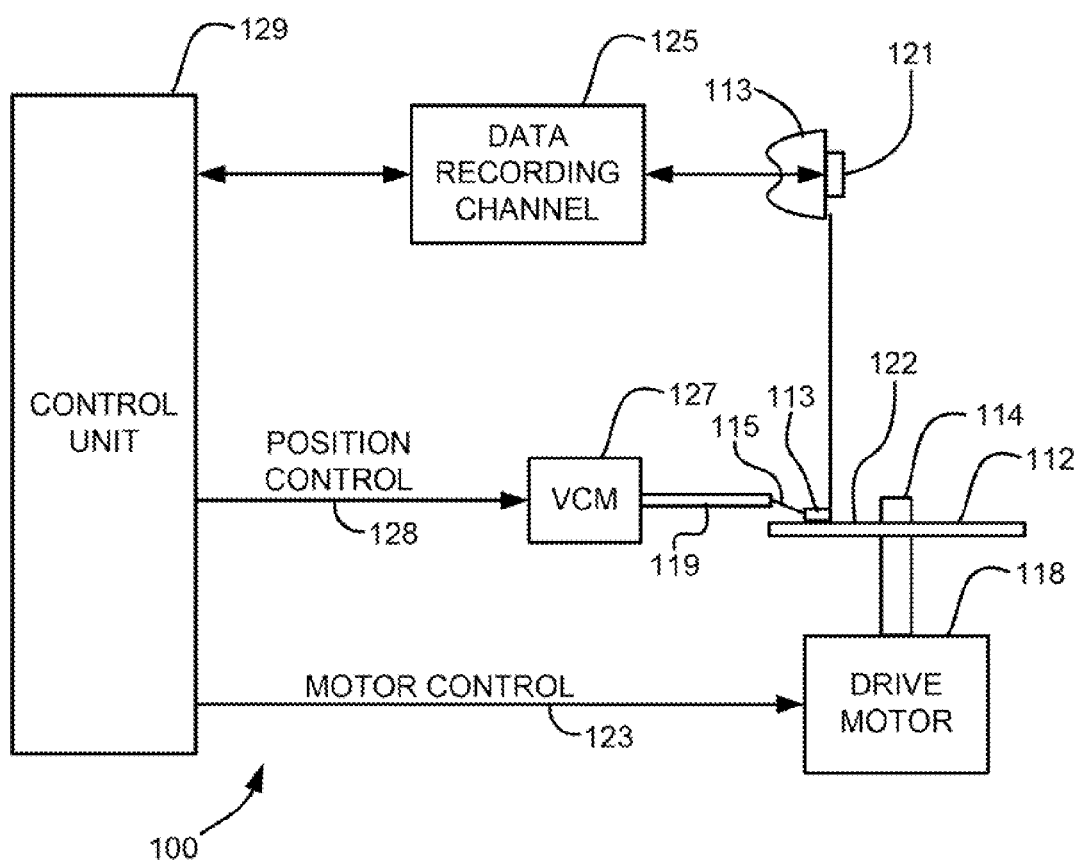
FIG. 1 is a simplified drawing of a magnetic recording disk drive system.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of disk-based storage systems and/or related systems and methods, as well as operation and/or component parts thereof.

In one embodiment, a magnetic recording head applies a recording magnetic field to a magnetic recording medium, and has a function which irradiates a high-frequency magnetic field, excites the magnetic resonance, and induces the magnetization reversal of the magnetic recording medium.

In one general embodiment, a magnetic head includes a main magnetic pole for writing to a magnetic medium, and a field generation layer (FGL) positioned above the main magnetic pole, wherein the main magnetic pole is adapted for producing a high-frequency magnetic field comprising oscillating microwaves, with the proviso that leakage from the high-frequency magnetic field does not cause adjacent track bit reversal.

In another general embodiment, a magnetic head includes a main magnetic pole for writing to a magnetic medium, a first microwave assisted magnetic recording (MAMR) element positioned above the main magnetic pole that is wider than the main magnetic pole in a track width direction and is positioned to extend beyond sides of the main magnetic pole in the track width direction, a spin-rectifying-current-pinned-magnetic layer positioned above the first MAMR element, a magnetic interlayer positioned above the spin-rectifying-current-pinned-magnetic layer, a FGL positioned above the magnetic interlayer, a magnetic-zone-control layer positioned above the FGL, a second MAMR element positioned above the magnetic-zone-control layer that is wider than the main magnetic pole in a track width direction and is positioned to extend beyond sides of the main magnetic pole in the track width direction, and a trailing shield positioned above the second MAMR element, wherein the main magnetic pole is adapted for producing a high-frequency magnetic field comprising oscillating microwaves, wherein during a writing operation, current is applied to the first and second MAMR elements so that the first and second MAMR elements produce magnetic fields which oppose bit-switching in the magnetic medium such that leakage from the high-frequency magnetic field does not cause adjacent track bit reversal, and wherein the first and second MAMR elements are spin torque oscillator-type elements.

According to another general embodiment, a method includes forming a main magnetic pole above a substrate, forming a first MAMR element above the main magnetic pole so that the first MAMR is wider than the main magnetic pole in a track width direction and is positioned to extend beyond sides of the main magnetic pole in the track width direction, forming a FGL above the first MAMR element, and forming a second MAMR element above the FGL so that the second MAMR is wider than the main magnetic pole in a track width direction and is positioned to extend beyond sides of the main magnetic pole in the track width direction.

In yet another general embodiment, a method includes producing a magnetic field from a main magnetic pole of a magnetic head to write data to a magnetic medium, producing a high-frequency magnetic field comprising oscillating microwaves from the main magnetic pole to assist bit-switching in a track being written on the magnetic medium, with the proviso that leakage from the high-frequency magnetic field does not cause adjacent track bit reversal, and applying current to MAMR elements positioned above and below the main magnetic pole so that the MAMR elements produce magnetic fields which oppose bit-switching in the magnetic medium in tracks adjacent to the track being written on the magnetic medium.

Referring now to FIG. 1, there is shown a disk drive 100 in accordance with one embodiment of the present invention. As shown in FIG. 1, at least one rotatable magnetic disk 112 is supported on a spindle 114 and rotated by a disk drive motor 118. The magnetic recording on each disk is typically in the form of an annular pattern of concentric data tracks (not shown) on the disk 112.

At least one slider 113 is positioned near the disk 112, each slider 113 supporting one or more magnetic read/write heads 121. As the disk rotates, slider 113 is moved radially in and out over disk surface 122 so that heads 121 may access different tracks of the disk where desired data are recorded and/or to be written. Each slider 113 is attached to an actuator arm 119 by means of a suspension 115. The suspension 115 provides a slight spring force which biases slider 113 against the disk surface 122. Each actuator arm 119 is attached to an actuator 127. The actuator 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of disk 112 generates an air bearing between slider 113 and disk surface 122 which exerts an upward force or lift on the slider. The air bearing thus counter-balances the slight spring force of suspension 115 and supports slider 113 off and slightly above the disk surface by a small, substantially constant spacing during normal operation. Note that in some embodiments, the slider 113 may slide along the disk surface 122.

The various components of the disk storage system are controlled in operation by control signals generated by control unit 129, such as access control signals and internal clock signals. Typically, control unit 129 comprises logic control circuits, storage (e.g., memory), and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Read and write signals are communicated to and from read/write heads 121 by way of recording channel 125.

In another embodiment, a magnetic data storage system, such as that described in FIG. 1 comprises at least one magnetic head 121, a magnetic disk medium 112 as described herein according to any embodiment, a drive mechanism 114/118 for passing the magnetic disk medium 112 over the at least one magnetic head 121, and a controller 129 electrically coupled to the at least one magnetic head 121 for controlling operation of the at least one magnetic head 121.

The above description of a typical magnetic disk storage system, and the accompanying illustration of FIG. 1 is for representation purposes only. It should be apparent that disk storage systems may contain a large number of disks and actuators, and each actuator may support a number of sliders.

An interface may also be provided for communication between the disk drive and a host (integral or external) to send and receive the data and for controlling the operation of the disk drive and communicating the status of the disk drive to the host, all as will be understood by those of skill in the art.

In a typical head, an inductive write head includes a coil layer embedded in one or more insulation layers (insulation stack), the insulation stack being located between first and second pole piece layers. A gap is formed between the first and second pole piece layers by a gap layer at an air bearing surface (ABS) of the write head. The pole piece layers may be connected at a back gap. Currents are conducted through the coil layer, which produce magnetic fields in the pole pieces. The magnetic fields fringe across the gap at the ABS for the purpose of writing bits of magnetic field information in tracks on moving media, such as in circular tracks on a rotating magnetic disk.

The second pole piece layer has a pole tip portion which extends from the ABS to a flare point and a yoke portion which extends from the flare point to the back gap. The flare point is where the second pole piece begins to widen (flare) to form the yoke. The placement of the flare point directly affects the magnitude of the magnetic field produced to write information on the recording medium.

FIG. 2A illustrates, schematically, a conventional recording medium such as used with magnetic disc recording systems, such as that shown in FIG. 1. This medium is utilized for recording magnetic impulses in or parallel to the plane of the medium itself. The recording medium, a recording disc in this instance, comprises basically a supporting substrate 200 of a suitable non-magnetic material such as glass, with an overlying coating 202 of a suitable and conventional magnetic layer.

FIG. 2B shows the operative relationship between a conventional recording/reproducing head 204, which may preferably be a thin film head, and a conventional recording medium, such as that of FIG. 2A.

FIG. 2C illustrates, schematically, the orientation of magnetic impulses substantially perpendicular to the surface of a recording medium as used with magnetic disc recording systems, such as that shown in FIG. 1. For such perpendicular recording the medium typically includes an under layer 212 of a material having a high magnetic permeability. This under layer 212 is then provided with an overlying coating 214 of magnetic material preferably having a high coercivity relative to the under layer 212.

FIG. 2D illustrates the operative relationship between a perpendicular head 218 and a recording medium. The recording medium illustrated in FIG. 2D includes both the high permeability under layer 212 and the overlying coating 214 of magnetic material described with respect to FIG. 2C above. However, both of these layers 212 and 214 are shown applied to a suitable substrate 216. Typically there is also an additional layer (not shown) called an "exchange-break" layer or "interlayer" between layers 212 and 214.

In this structure, the magnetic lines of flux extending between the poles of the perpendicular head 218 loop into and out of the overlying coating 214 of the recording medium with the high permeability under layer 212 of the recording medium causing the lines of flux to pass through the overlying coating 214 in a direction generally perpendicular to the surface of the medium to record information in the overlying coating 214 of magnetic material preferably having a high coercivity relative to the under layer 212 in the form of magnetic impulses having their axes of magnetization substantially perpendicular to the surface of the medium. The flux is channeled by the soft underlying coating 212 back to the return layer (P1) of the head 218.

FIG. 2E illustrates a similar structure in which the substrate 216 carries the layers 212 and 214 on each of its two opposed sides, with suitable recording heads 218 positioned adjacent the outer surface of the magnetic coating 214 on each side of the medium, allowing for recording on each side of the medium.

FIG. 3A is a cross-sectional view of a perpendicular magnetic head. In FIG. 3A, helical coils 310 and 312 are used to create magnetic flux in the stitch pole 308, which then delivers that flux to the main pole 306. Coils 310 indicate coils extending out from the page, while coils 312 indicate coils extending into the page. Stitch pole 308 may be recessed from the ABS 318. Insulation 316 surrounds the coils and may provide support for some of the elements. The direction of the media travel, as indicated by the arrow to the right of the structure, moves the media past the lower return pole 314 first, then past the stitch pole 308, main pole 306, trailing shield 304 which may be connected to the wrap around shield (not shown), and finally past the upper return pole 302. Each of these components may have a portion in contact with the ABS 318. The ABS 318 is indicated across the right side of the structure.

Perpendicular writing is achieved by forcing flux through the stitch pole 308 into the main pole 306 and then to the surface of the disk positioned towards the ABS 318.

FIG. 3B illustrates a piggyback magnetic head having similar features to the head of FIG. 3A. Two shields 304, 314 flank the stitch pole 308 and main pole 306. Also sensor shields 322, 324 are shown. The sensor 326 is typically positioned between the sensor shields 322, 324.

FIG. 4A is a schematic diagram of one embodiment which uses looped coils 410, sometimes referred to as a pancake configuration, to provide flux to the stitch pole 408. The stitch pole then provides this flux to the main pole 406. In this orientation, the lower return pole is optional. Insulation 416 surrounds the coils 410, and may provide support for the stitch pole 408 and main pole 406. The stitch pole may be recessed from the ABS 418. The direction of the media travel, as indicated by the arrow to the right of the structure, moves the media past the stitch pole 408, main pole 406, trailing shield 404 which may be connected to the wrap around shield (not shown), and finally past the upper return pole 402 (all of which may or may not have a portion in contact with the ABS 418). The ABS 418 is indicated across the right side of the structure. The trailing shield 404 may be in contact with the main pole 406 in some embodiments.

FIG. 4B illustrates another type of piggyback magnetic head having similar features to the head of FIG. 4A including a looped coil 410, which wraps around to form a pancake coil. Also, sensor shields 422, 424 are shown. The sensor 426 is typically positioned between the sensor shields 422, 424.

In FIGS. 3B and 4B, an optional heater is shown near the non-ABS side of the magnetic head. A heater (Heater) may also be included in the magnetic heads shown in FIGS. 3A and 4A. The position of this heater may vary based on design parameters such as where the protrusion is desired, coefficients of thermal expansion of the surrounding layers, etc.

In some approaches, locally reducing the coercive force of the recording medium by using a high-frequency magnetic field in the recording magnetic field produced by the magnetic recording head in order to aid in recording is possible. In recording systems which use the magnetic resonance between this type of high-frequency magnetic field and the magnetic field of the magnetic head, hereinafter referred to as Microwave-Assisted Magnetic Recording (MAMR), since magnetic resonance is used, a strong high-frequency magnetic field having a frequency proportional to the anisotropic magnetic field of the medium is not used, and the reduced effect of a large magnetization reversal magnetic field typically cannot be obtained. It is extremely difficult to fabricate a magnetic field generating element capable of generating this type of strong high-frequency magnetic field having dimensions which allow for installation in the magnetic head, using conventional methods. Thus, microwave-assisted recording, as a technology, has been abandoned by the industry for the most part because of the difficulty in implementing it.

However, over the past few years, the generation of a high-frequency magnetic field using spin torque technology has advanced, and microwave-assisted recording has once again been researched. One technology which places a magnetized high-speed rotor or field generation layer (FGL), which is rotated at high speed by spin torque in the vicinity of the magnetic recording medium adjacent to the main magnetic pole of the perpendicular magnetic head, generates a microwave (high-frequency wave) magnetic field, and records information on a magnetic recording medium having large magnetic anisotropy has been developed.

Another technology which uses a high-frequency magnetic field generator has been developed which uses the magnetic field of the main magnetic pole close to the FGL to control the direction of rotation of the FGL. On this basis, high-efficiency microwave-assisted reversal of the medium may be implemented.

According to one embodiment, a method ensures that the magnetic field strength required to reverse the magnetization of a medium in a wide magnetic recording width is provided. Furthermore, the strong magnetic field protects adjacent data from inadvertent reversal of state even when fluctuations are produced in positions radially adjacent to the assisted element and the recording element due to a skew in the angle with which the magnetic head is presented.

In one preferred embodiment, and in order to ensure inadvertent reversals do not occur, rotation (clockwise direction or counter-clockwise) of the MAMR is used, which can easily reverse the magnetization direction of the magnetic field in the magnetic recording disk. This approach may be realized by employing a MAMR element capable of having its direction of rotation reversed in response to flowing current in one direction, where flowing current in that direction does not concurrently cause reversal of the magnetization of the bits being written.

In another embodiment, the width of the recording magnetic field depends on the interval between the two MAMR elements rotating opposite the magnetization of a magnetic medium. By placing the MAMR elements in an opposing rotational direction, relative to the adjacent data tracks, the data in adjacent data tracks is not reversed even when a leaking magnetic field enters the adjacent data tracks.

With reference to FIGS. 5A-5C and 6A-6B, the magnetization reversal direction of the MAMR is described below according to various embodiments.

Figures 5A, 5B, 5C:
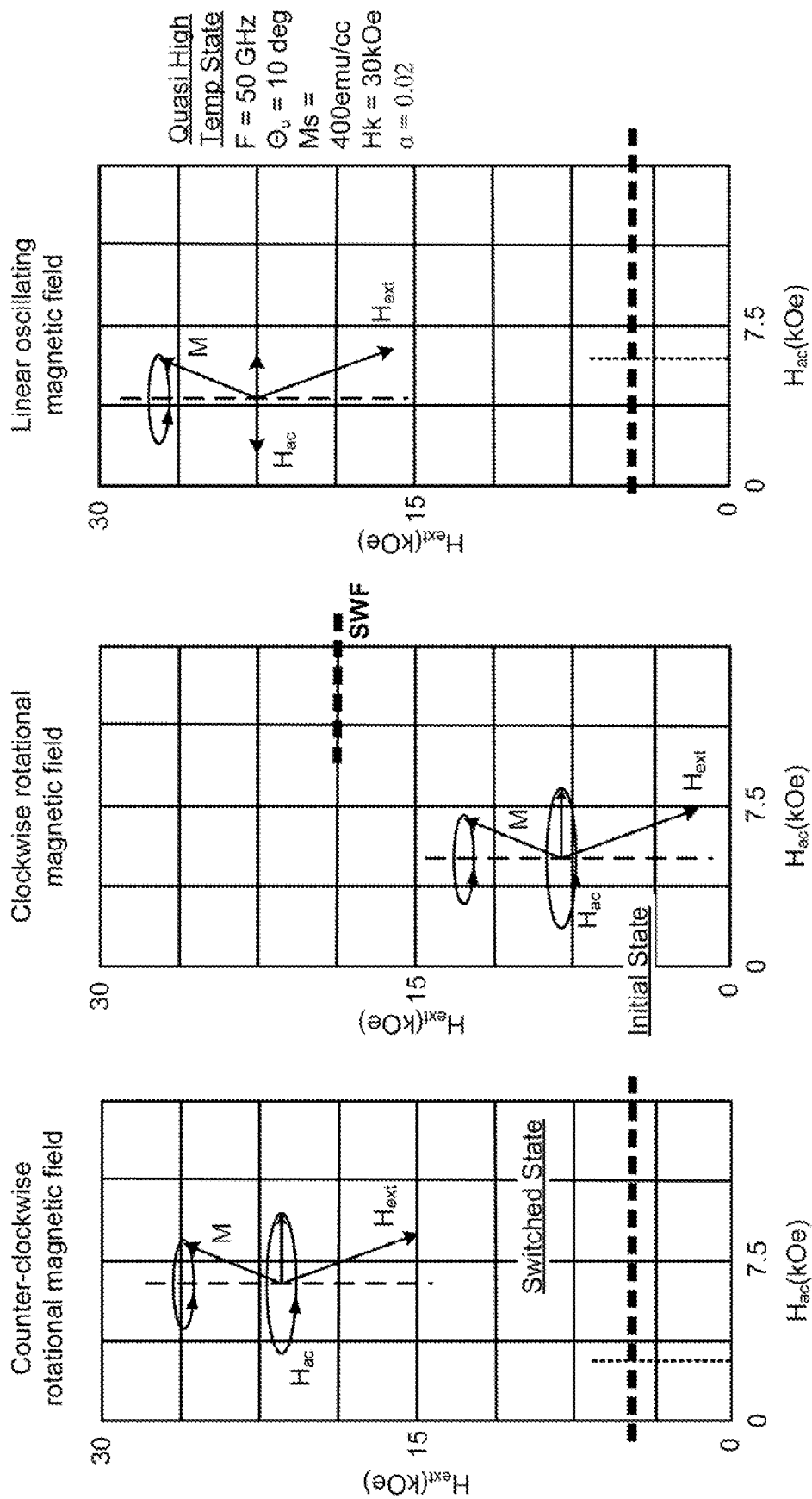
FIG. 5A illustrates microwave-assisted magnetization reversal calculations, according to one embodiment under a counter-clockwise rotational magnetic field.
FIG. 5B illustrates microwave-assisted magnetization reversal calculations, according to one embodiment under a clockwise rotational magnetic field.
FIG. 5C illustrates microwave-assisted magnetization reversal calculations, according to one embodiment under a linear oscillating magnetic field.

FIGS. 5A-5C show the difference in the ease of magnetization reversal as a function of the direction of rotation of the microwaves oscillating from the MAMR element.

In the embodiment depicted in FIG. 5A, the MAMR magnetization is shown in a switched state corresponding to a counter-clockwise rotational magnetic field.

In FIG. 5B, the MAMR magnetization reversal is shown in an initial state corresponding to a clockwise rotational magnetic field.

In FIG. 5C, the MAMR magnetization reversal is shown in a quasi-high temperature state corresponding to a linear oscillating magnetic field. Furthermore, the linear oscillating magnetic field may be characterized as a quasi high-temperature state, having properties substantially as follows: a frequency of about 50 GHz, a nominal saturation magnetization (Ms) of about 400 emu/cc, an anisotropy field strength (Hk) of about 30 kOe, a Gilbert damping constant (α) of about 0.02, and a field angle ($\theta_u$) of about 10°. Of course, these properties are offered by way of example only, and are not intended to be limiting in any way.

Figure 6A:
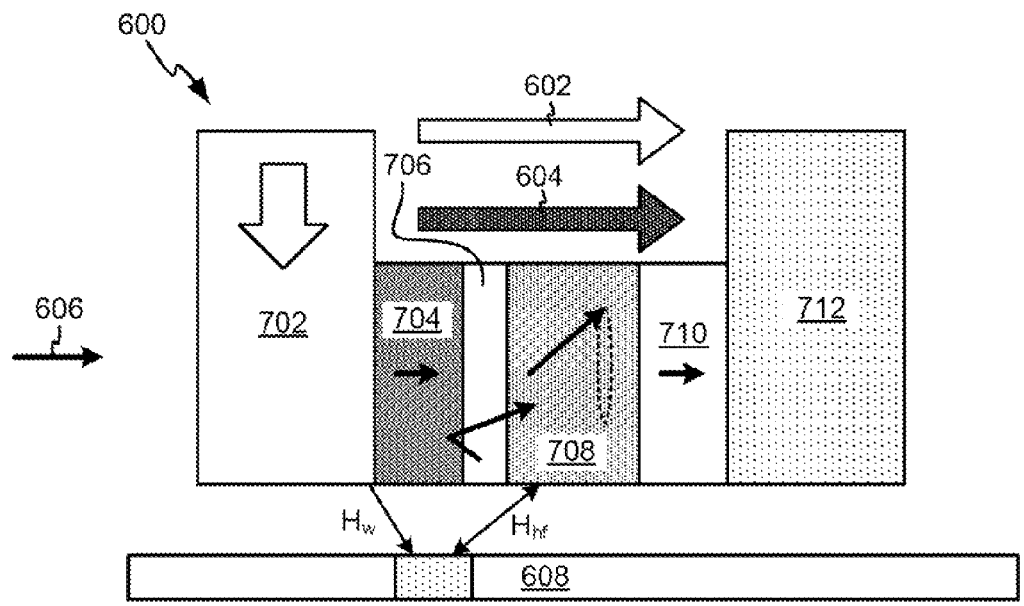
FIG. 6A shows a side view of a microwave-assisted magnetic head, according to one embodiment.
Figure 6B:
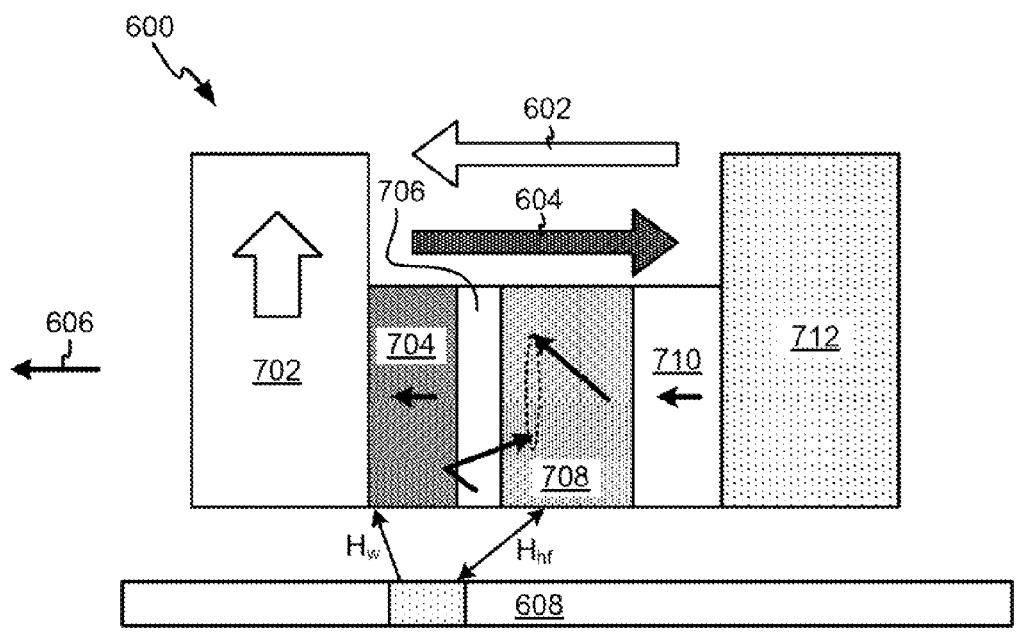
FIG. 6B shows a side view of a microwave-assisted magnetic head, according to one embodiment.

FIGS. 6A-6B show the change in the rotation direction of microwaves, according to the current 604 flowing into a microwave-assisted magnetic recording (MAMR) element (not shown), according to one embodiment. A layer structure 600 comprises a main pole 702, a first magnetic film layer (such as a spin-rectifying-current-pinned magnetized layer) 704, a magnetic interlayer 706, a field generation layer (FGL) 708, a second magnetic film layer (such as a magnetic zone control layer) 710, and a trailing magnetic shield 712.

Figure 7:
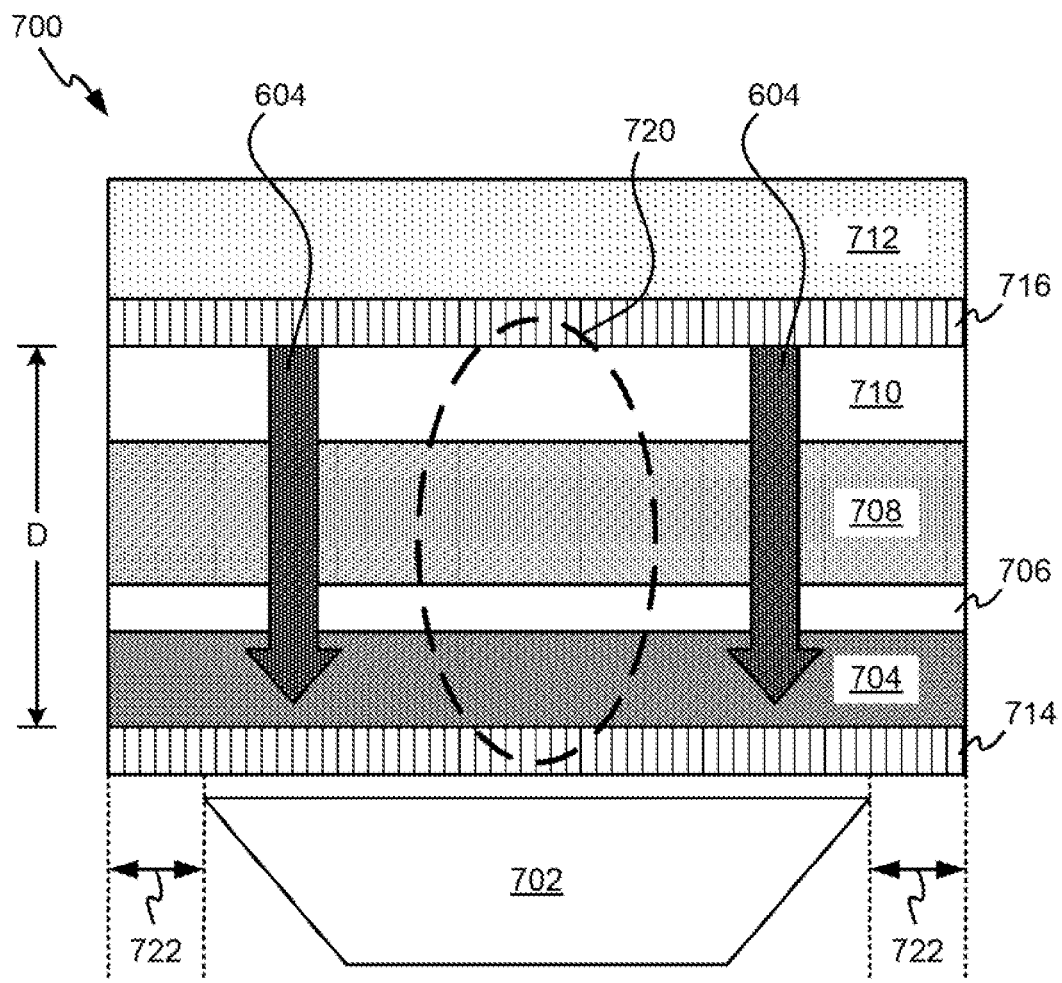
FIG. 7 shows an air bearing surface view of a microwave-assisted magnetic head, according to one embodiment.

As shown in FIG. 7, in some approaches, the structure 700 may comprise a first MAMR element 714 between the main pole 702 and the first magnetic film layer 704, and a second MAMR element 716 between the second magnetic film layer 710 and the trailing magnetic shield 712.

In the embodiment shown in FIGS. 6A-6B, and 7, when the magnetic field 602 oscillates from the main pole 702, it tends to reverse the magnetization of the recording medium 608. However, by causing the magnetization of the MAMR elements 714, 716 to be in the opposite direction, as shown in FIG. 6B, the magnetization reversal of the medium in region 720 is prevented even when a leaking magnetic field enters the adjacent data.

FIG. 7 shows a proposed design for an alternating current (AC) field assisted perpendicular recording magnetic head 700, according to one embodiment. The magnetic head 700 is a perpendicular spin torque driven oscillator, capable of generating a localized AC field in the microwave frequency region. The oscillator comprises a main magnetic pole 702, a first microwave-assisted magnetic recording (MAMR) element 714 formed above the main magnetic pole 702, a permanently perpendicularly magnetized layer 704 for spin polarization of the injected current formed above the first MAMR element 714, a magnetic interlayer 706 formed above the permanently perpendicularly magnetized layer 704, a high saturation moment FGL 708 formed above the magnetic interlayer 706, a magnetic zone control layer 710 with perpendicular anisotropy formed above the FGL 708, a second MAMR element 716 formed above the magnetic zone control layer 710, and a trailing shield 712 formed above the second MAMR 716. These layers are characterized by having an alternating current 604 flowing therethrough. As shown in FIG. 7, the current 604 is flowing downward, but of course, in other embodiments, the current 604 may flow upward.

Furthermore, the magnetic field strength required to reverse the magnetization of the medium is produced between the two MAMR elements 714, 716 by the main magnetic pole 702. Furthermore, the two MAMR elements 714, 716 may preferably be separated by a distance D which approximately corresponds to a target magnetic recording width. The MAMR elements 714, 716 may comprise any suitable material and may have a suitable thickness and depth as would be understood one of skill in the art upon reading the present descriptions. In this case, the outermost width of the two MAMR elements 714, 716 is preferably made to be wider than the recording magnetic field width produced by the main magnetic pole 702. In FIG. 7, distances indicated by lines 722 represent this additional width. Based on this structure, the magnetic field strength required to reverse the magnetization of the medium can be ensured across a wide magnetic recording width, and protection of the adjacent data, can be realized.

Unless otherwise described herein, the various layers, components, process steps, etc., may be of a type known in the art. Accordingly, one skilled in the art armed with the teachings herein would appreciate how to make and use the various embodiments of the present invention. For example, in one embodiment, the MAMR elements 714, 716 may be of a type known by one of skill in the art.

Employing the embodiment described above, data may be recorded using the magnetic field from the main magnetic pole without inadvertently erasing data in adjacent bits. Furthermore, due to the simple structure of the unassisted elements, it is possible to reduce magnetic recording width errors compared to conventional fabrication errors in magnetic recording width.

Figure 8:
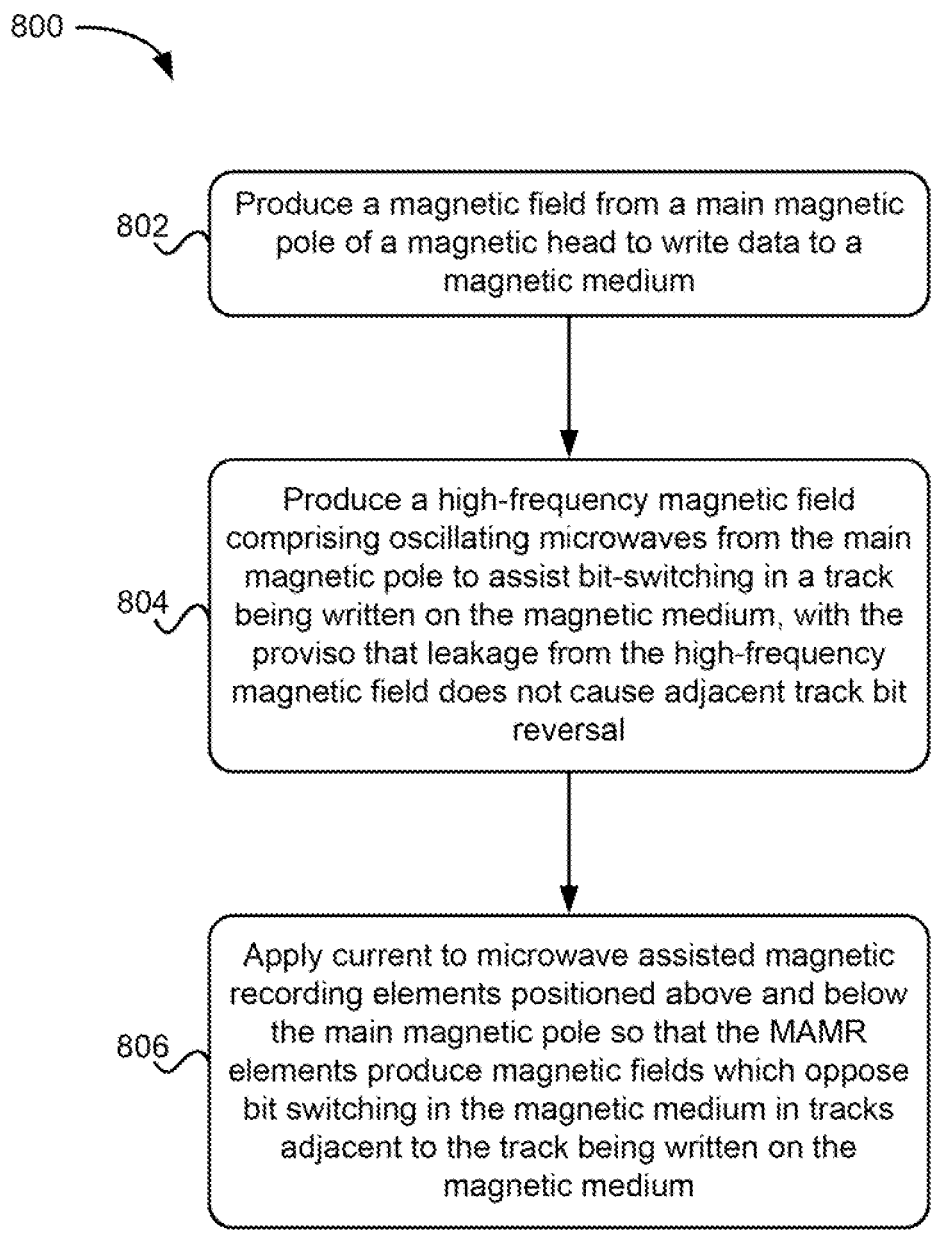
FIG. 8 shows a flowchart of a method, according to one embodiment.

FIG. 8 depicts a flowchart of a method 800 for conducting microwave-assisted magnetization reversal using a magnetic head as described herein, according to one embodiment. As shown in FIG. 8, the method includes at least three primary steps.

First, in operation 802, a main magnetic pole of a magnetic head produces a magnetic field to write data to a magnetic medium.

Next, in operation 804, a high-frequency magnetic field comprising oscillating microwaves is produced by the main magnetic pole to assist bit-switching in a track being written on the magnetic medium, provided that leakage from the high-frequency magnetic field does not cause adjacent track bit reversal.

Then, in operation 806, a current is applied to MAMR elements positioned above and below the main magnetic pole so that the MAMR elements produce magnetic fields which oppose bit-switching in the magnetic medium in tracks adjacent to the track being written on the magnetic medium.

In other approaches, the MAMR elements may be formed such that they are wider than the main magnetic pole in a track width direction and extend beyond sides of the main magnetic pole in the track width direction.

Figure 9:
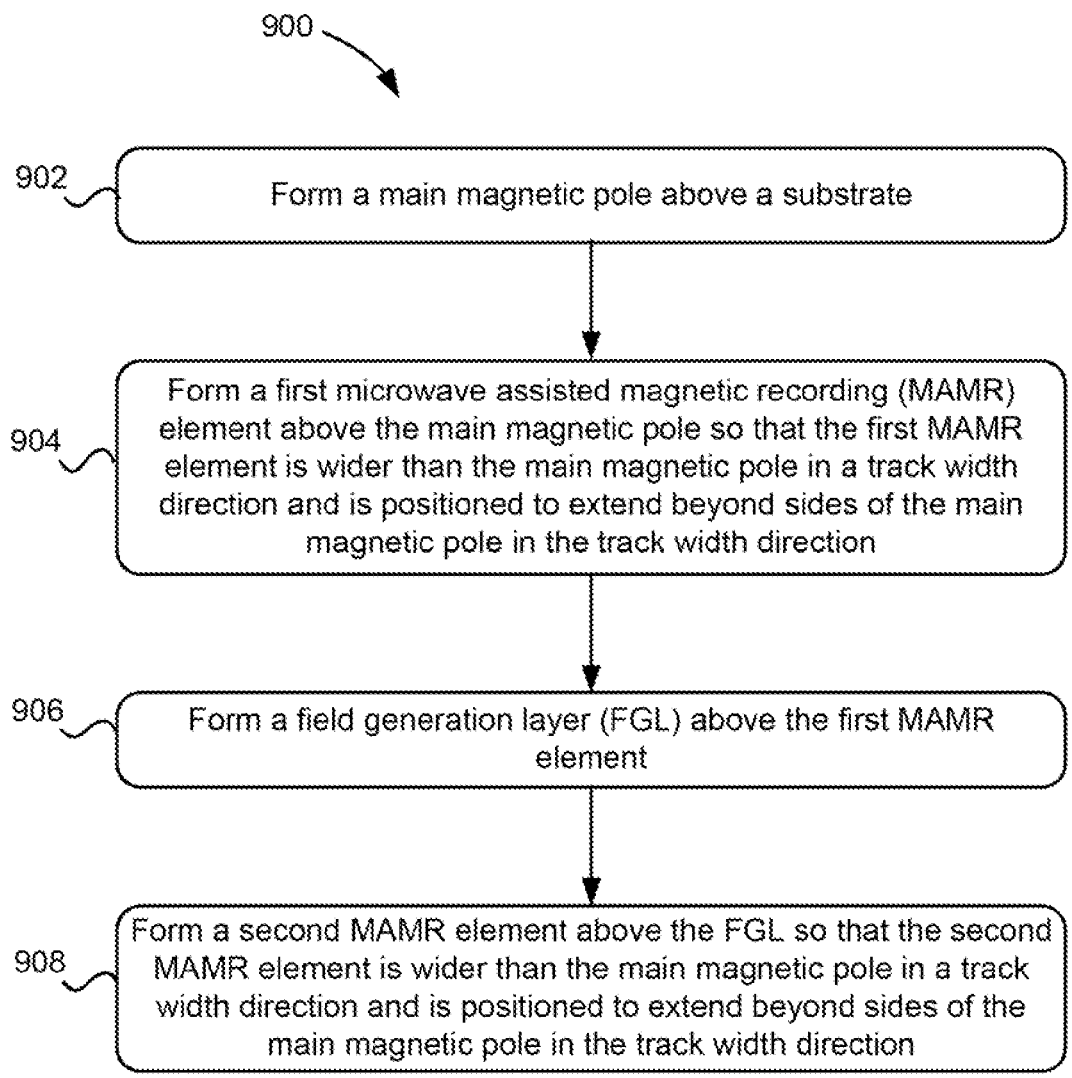
FIG. 9 shows a flowchart of a method, according to one embodiment.

FIG. 9 depicts a flowchart of a method 900 for forming a magnetic head with the above-described properties, according to one embodiment. The method 900 may be carried out in any desired environment, including those depicted in FIGS. 1-7, among others.

In operation 902, a main magnetic pole is formed above a substrate. The substrate and main magnetic pole may be made from any material suitable for operation in a magnetic medium, as would be understood by those having ordinary skill in the art upon reading the present descriptions.

Subsequently, in operation 904, a first MAMR element is formed above the main magnetic pole so that the first MAMR element is wider than the main magnetic pole in a track width direction and is positioned to extend beyond sides of the main magnetic pole in a track width direction.

Then, in operation 906 a FGL is formed above the first MAMR element. In preferred embodiments, the FGL may be made of any suitable material capable of producing a high saturation moment, as would be understood by those having ordinary skill in the art upon reading the present descriptions.

Next, in operation 908, a second MAMR element is formed above the main magnetic pole so that the second MAMR element is wider than the main magnetic pole in a track width direction and is positioned to extend beyond sides of the main magnetic pole in the track width direction. The first and second MAMR elements may be constructed from any suitable material as would be understood by those having ordinary skill in the art upon reading the present descriptions. In preferred embodiments, the first and second MAMR elements may be spin torque oscillator-type elements.

In one embodiment, a spin-rectifying-current-pinned magnetic layer may be formed above the first MAMR element and below the FGL. The spin-rectifying-current-pinned magnetic layer is permanently perpendicularly magnetized in some embodiments, but may comprise any material and arrangement capable of polarizing spin of current injected through the spin-rectifying-current-pinned magnetic layer, as would be understood by those having ordinary skill in the art upon reading the present descriptions.

In some approaches, a magnetic interlayer may be formed above the spin-rectifying-current-pinned magnetic layer. The magnetic interlayer may be formed of any suitable metallic material that does not interfere with the microwave-assist action on the magnetic fields generated in the recording region, as would be understood by those having ordinary skill in the art upon reading the present descriptions.

In more approaches, a magnetic-zone-control layer, characterized by having perpendicular anisotropy, may be formed above the FGL.

In additional embodiments, a trailing shield may be formed above the second MAMR element. The trailing shield may comprise any suitable material as would be understood by those having ordinary skill in the art upon reading the present descriptions.

In further embodiments, the order of the various layers may be reversed, rendering equivalent structures to those described herein.

In one embodiment, a magnetic data storage system may comprise at least one magnetic head according to any embodiment described herein, a magnetic disk medium, a drive mechanism for passing the magnetic disk medium over the at least one magnetic head, and a controller electrically coupled to the at least one magnetic head for controlling operation of the at least one magnetic head, such as those components described in FIG. 1.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A magnetic head, comprising:
a main magnetic pole for writing to a magnetic medium; and
a field generation layer (FGL) positioned above the main magnetic pole;
a first microwave assisted magnetic recording (MAMR) element positioned above the main pole and below the FGL; and
a second MAMR element positioned above the FGL,
wherein the main magnetic pole is adapted for producing a high-frequency magnetic field comprising oscillating microwaves,
wherein the first and second MAMR elements are configured to produce magnetization in a direction opposite the high-frequency magnetic field when the high-frequency magnetic field oscillates.

2. The magnetic head as recited in claim 1, wherein during a writing operation, current is applied to the first and second MAMR elements so that the first and second MAMR elements produce magnetic fields which oppose bit-switching in adjacent tracks of the magnetic medium.

3. The magnetic head as recited in claim 2, further comprising:
a first magnetic film layer positioned above the first MAMR element and below the FGL;
a magnetic interlayer positioned above the first magnetic film layer and below the FGL; and
a second magnetic film layer positioned above the FGL and below the second MAMR element.

4. The magnetic head as recited in claim 3, wherein the first magnetic film layer is a spin-rectifying-current-pinned-magnetic layer.

5. The magnetic head as recited in claim 3, wherein the second magnetic film layer is a magnetic-zone-control layer.

6. The magnetic head as recited in claim 2, wherein the first and second MAMR elements are wider than the main magnetic pole in a track width direction and are positioned to extend beyond sides of the main magnetic pole in the track width direction.

7. The magnetic head as recited in claim 2, further comprising a trailing shield positioned above the second MAMR element.

8. The magnetic head as recited in claim 2, wherein the first and second MAMR elements are configured to have their rotation reversed by reversing a flow of current through the first and second MAMR elements.

9. A magnetic data storage system, comprising:
at least one magnetic head as recited in claim 1;
a magnetic disk medium;
a drive mechanism for passing the magnetic disk medium over the at least one magnetic head; and
a controller electrically coupled to the at least one magnetic head for controlling operation of the at least one magnetic head.

10. A magnetic head, comprising:
a main magnetic pole for writing to a magnetic medium;
a first microwave assisted magnetic recording (MAMR) element positioned above the main magnetic pole that is wider than the main magnetic pole in a track width direction and is positioned to extend beyond sides of the main magnetic pole in the track width direction;
a spin-rectifying-current-pinned-magnetic layer positioned above the first MAMR element;
a magnetic interlayer positioned above the spin-rectifying-current-pinned-magnetic layer;
a field generation layer (FGL) positioned above the magnetic interlayer;
a magnetic-zone-control layer positioned above the FGL;
a second MAMR element positioned above the magnetic-zone-control layer that is wider than the main magnetic pole in a track width direction and is positioned to extend beyond sides of the main magnetic pole in the track width direction; and
a trailing shield positioned above the second MAMR element,
wherein the main magnetic pole is adapted for producing a high-frequency magnetic field comprising oscillating microwaves,
wherein during a writing operation, current is applied to the first and second MAMR elements so that the first and second MAMR elements produce magnetic fields which oppose hit-switching in the magnetic medium such that leakage from the high-frequency magnetic field does not cause adjacent track bit reversal, and
wherein the first and second MAMR elements have their rotation reversed by flowing current through the first and second MAMR elements to produce magnetic fields in a direction opposite the high-frequency magnetic field in order to prevent magnetization reversal in tracks adjacent to a track being written on the magnetic medium.

11. A method, comprising:

forming a main magnetic pole above a substrate, the main pole being configured for producing a high-frequency magnetic field to write to a magnetic medium;

forming a first microwave assisted magnetic recording (MAWR) element above the main magnetic pole so that the first MAMR is wider than the main magnetic pole in a track width direction and is positioned to extend beyond sides of the main magnetic pole in the track width direction;

forming a field generation layer (FGL) above the first MAMR element; and forming a second MAMR element above the FGL so that the second MAMR is wider than the main magnetic pole in a track width direction and is positioned to extend beyond sides of the main magnetic pole in the track width direction, wherein the first MAMR element and the second MAMR element are configured to produce magnetization in a direction opposite the high-frequency magnetic field during a writing operation in order to prevent magnetization reversal in tracks adjacent to a track being written on the magnetic medium.

12. The method as recited in claim 11, further comprising:

forming a spin-rectifying-current-pinned-magnetic layer above the first MAMR element;

forming a magnetic interlayer above the spin-rectifying-current-pinned-magnetic layer;

forming a magnetic-zone-control layer above the FGL; and forming a trailing shield above the second MAMR element.

13. A method, comprising:

producing a magnetic field from a main magnetic pole of a magnetic head to write data to a magnetic medium;

producing a high-frequency magnetic field comprising oscillating microwaves from the main magnetic pole to assist bit-switching in a track being written on the magnetic medium, with the proviso that leakage from the high-frequency magnetic field does not cause adjacent track bit reversal;

applying current to microwave assisted magnetic recording (MAMR) elements positioned above and below the main magnetic pole so that the MAMR elements produce magnetic fields which oppose bit-switching in the magnetic medium in tracks adjacent to the track being written on the magnetic medium; and reversing a flow of current through the MAMR, elements for reversing a direction of rotation thereof during a writing operation.

14. The method as recited in claim 13, wherein the MAMR elements are wider than the main magnetic pole in a track width direction and extend beyond sides of the main magnetic pole in the track width direction.

* * * * *

UNITED STATES PATENT AND TRADEMARK OFFICE
CERTIFICATE OF CORRECTION

| | | |
|---|---|---|
| PATENT NO. | : 8,634,163 B2 | Page 1 of 1 |
| APPLICATION NO. | : 13/191563 | |
| DATED | : January 21, 2014 | |
| INVENTOR(S) | : Tanabe et al. | |

It is certified that error appears in the above-identified patent and that said Letters Patent is hereby corrected as shown below:

In the claims:

col. 12, line 59 replace "hit-switching" with --bit-switching--.

Signed and Sealed this
Fifteenth Day of April, 2014

Michelle K. Lee
*Deputy Director of the United States Patent and Trademark Office*